PALLET LOCKING MECHANISM

Original Filed Feb. 19, 1962 4 Sheets-Sheet 1

INVENTOR.
LESLIE MOLLON
BY Wallace Hallett & De Prospo
ATTORNEYS

PALLET LOCKING MECHANISM

Original Filed Feb. 19, 1962 4 Sheets-Sheet 2

INVENTOR.
LESLIE MOLLON
BY [signature]
ATTORNEYS

PALLET LOCKING MECHANISM

Original Filed Feb. 19, 1962 4 Sheets-Sheet 3

INVENTOR.
LESLIE MOLLON
BY Whittemore, Hulbert & Belknap
ATTORNEYS

PALLET LOCKING MECHANISM

Original Filed Feb. 19, 1962 4 Sheets-Sheet 4

INVENTOR.
LESLIE MOLLON
BY Whittemore, Hulbert & Belknap
ATTORNEYS

United States Patent Office

Re. 26,873
Reissued April 28, 1970

26,873

PALLET LOCKING MECHANISM

Leslie Mollon, Southfield, Mich., assignor to Brooks & Perkins, Inc., Detroit, Mich., a corporation of Delaware Original No. 3,182,608, dated May 11, 1965, Ser. No. 174,021, Feb. 19, 1962. Application for reissue May 7, 1968, Ser. No. 741,830

Int. Cl. B65j *1/22;* B60p *7/08*

U.S. Cl. 105—366 14 Claims

Matter enclosed in heavy brackets [ ] appears in the original patent but forms no part of this reissue specification; matter printed in italics indicates the additions made by reissue.

*ABSTRACT OF THE DISCLOSURE*

*An aircraft cargo lock comprises a dog pivotally mounted on a side restraining rail to swing through an opening in the latter into restraining engagement with a load pallet. A detent is pivotally mounted upon the dog to swing, under actuation by a spring-type over-center device, into and out of restraining engagement with a fixed pin to releasably hold the dog in its pallet locking position.*

The present invention relates to improvements in aerial unloading kits used in military cargo aircraft making it suitable for use in the ground loading and unloading of military logistics cargo, or other commercial cargo transported in vehicles involving loading arrangements generally similar to those of military transport craft.

It is an object of the invention to provide a load locking mechanism or equipment devised for use in association with an existing idler roller and restraint rail installation, along which load supporting pallets or platforms are advanced to or from latched and locked position in loading and unloading, the invention affording an improved and simplified, optionally manual or automatic, direct unlatching or latching of the pallets.

Another object is to provide a cargo handling system which, though extremely simple and inexpensive in nature, both as to structure and operation is amply adequate to meet all existing specifications in regard to load restraint factors.

Still another object is to provide a mechanism as described, of which basic components are adapted for application to a known aerial unloading kit installation, substantially without alteration of the latter, and in which presently employed types of load platforms or logistic pallets are employed without change and simultaneously or interchangeably.

A further object is to provide load locking equipment of the sort described, in which fore-and-aft restraint may be exercised at plural points longitudinally of each locked load pallet or assembly, and in which an efficient spacing of the lock mechanisms enables the required number of the latter to be kept to a minimum.

Yet another object is to provide a mechanism as described, in which, due to a standardized design of certain components, a significant reduction in regard to spare part requirements is had; and in which, due to the simplicity and ruggedness of components, improved efficiency in possible in regard to maintenance, repair, part replacement, inspection checks and adjustments, personnel training, and the like.

A general object is to provide load locking mechanism as described, which may be employed optionally in a simple installation in which manual and individual operation alone of the various locking or latching sub-assemblies is contemplated, or in which a ganged installation involving means for simultaneously operating a number of like sub-assemblies is preferred. In each case, the provisions are such that the latching parts, per se, of the respective sub-assemblies are positively held in place in both the latching and the unlatched positions thereof, thus providing positive fore-and-aft restraint in the former position and impossibility of interference in the latter position.

In accordance with the several embodiments thereof, the invention affords a cargo latching mechanism which may simply be provided with a manually or automatically withdrawable lock pin for a swingable latch part or dog, or may further incorporate lever and toggle type or equivalent provisions for locking and unlocking the latch part should load force on the lock pin tend to snub the same and make its release difficult.

The foregoing as well as other objects will become more apparent as this description proceeds, especially when considered in connection with the accompanying drawings illustrating the invention, wherein:

FIG. 1 is a fragmentary, more or less schematic perspective view showing a typical assembly of components of the equipment of the invention, in one embodiment thereof, a locking or latching part or dog thereof being shown in solid lines in an operative position and in dotted lines in a retracted or swungback unlatching position, and a released position of a quick release type of lock pin being indicated in dot-dash line;

Figure 12:
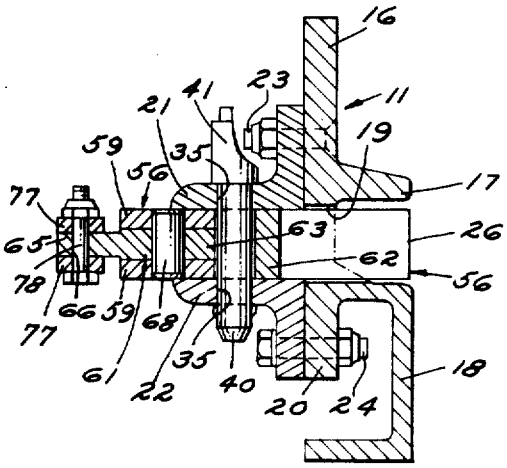
Figure 14:
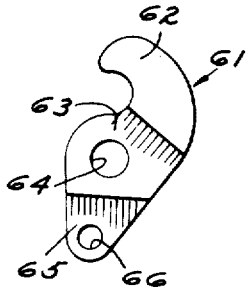
Figure 15:
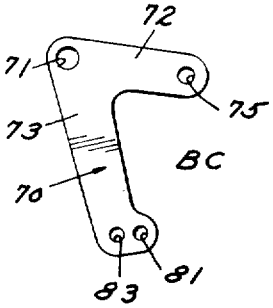
Figure 13:
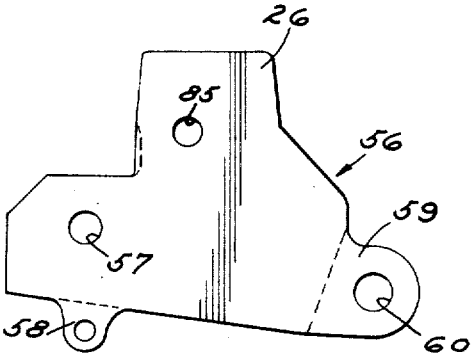
Figure 10:
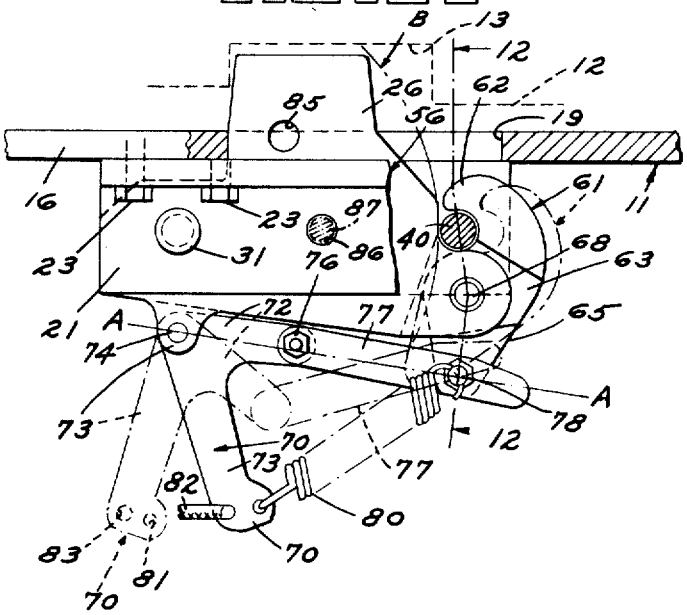
FIG. 10 is a top plan view, partially broken away and in horizontal section, of an alternative mechanism for latching and unlatching, with the assistance of releasable lever and toggle operated keeper means, and without removing the lock pin.
Figure 11:
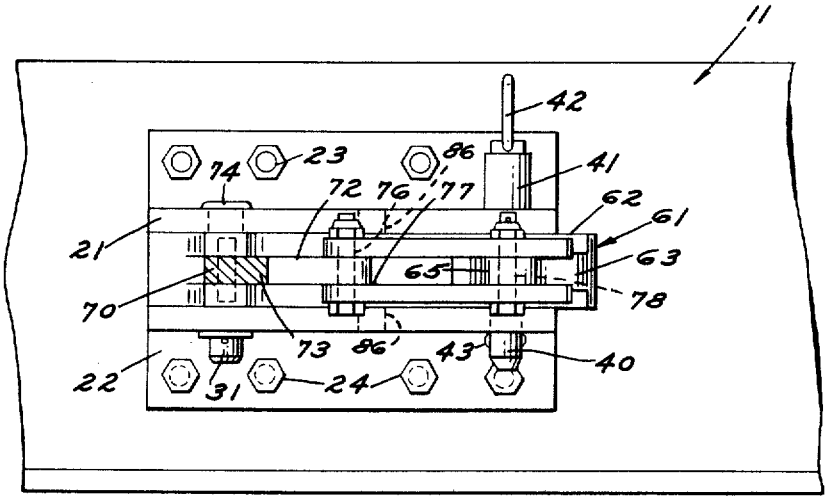
FIG. 11 is a fragmentary side elevation of the mechanism of FIG. 10.

FIG. 12 is a view in transverse vertical section on line 12—12 of FIG. 10; and FIGS. 13, 14 and 15 are top plan views of component parts of the embodiment of FIGS. 10, 11 and 12.

First referring to FIGS. 1–4, an individual latch assembly in accordance with the invention, generally designated 10, is shown as operatively applied to a longitudinal cargo restraint rail, generally designated 11, such as is commonly employed in aircraft cargo loading interiors.

Figure 3:
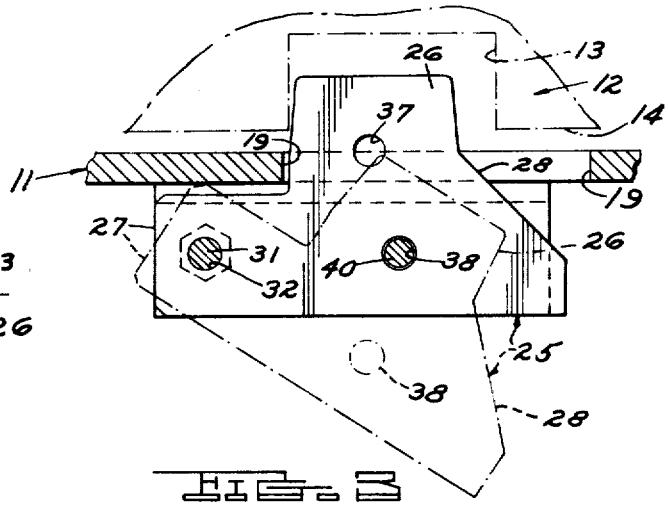
FIG. 3 is a fragmentary view in horizontal section along line 3—3 of FIG. 2, respectively showing in solid and dotted lines the operative latching and inoperative withdrawn positions of the latching part, and indicating in dot-dash line a load supporting pallet with which the equipment coacts.
Figure 4:
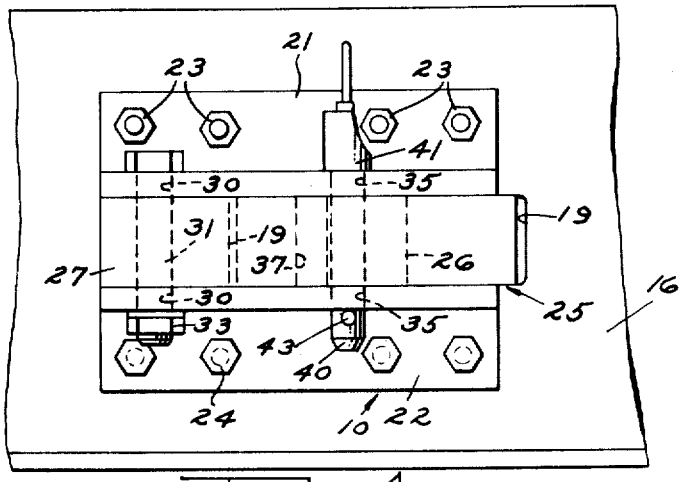
FIG. 4 is a fragmentary view in side elevation of the installed lock unit.

It is to be understood that the deck of the interior is equipped with a plurality of such rails in parallel, transversely spaced relation to one another, and that alongside of each rail there extends an idler roller type of load conveyor (not shown) upon the rollers of which individual load supporting platforms or pallets, generally designated 12 in FIG. 3, are supported, being laterally guided and restrained by the rails in question. Each such pallet 12 is conventionally provided with a plurality of recesses 13 of generally rectangular outline formed therein at longitudinally spaced points along the side edge 14 of the pallet.

The usual cross section of the rail 11 provides an upright restraining rail portion 16, a laterally inwardly offset flange 17 coextensive in length with rail 11 and located substantially beneath the top of rail portion 16, and an integral box-like flange portion 18 which is adapted to be bolted or otherwise secured to the cargo deck. Rail 11 is provided between the flange 17 and the top of the box-formation 18 with a series of longitudinally elongated slots 19 which open horizontally through the rail in the longitudinal zone in question. The box-like formation 18 includes an integral outer and depending flange portion 20 which, along with the restraining rail portion 16, affords means for the attachment of the latching assembly 10 to rail 11.

The latching assembly comprises a pair of like, relatively short, upper and lower lengths 21, 22, respectively, of rugged angle stock, with bolted connections at 23, 24, respectively to the rail portion 16 above flange 17 and to the depending integral portion 20. These angle sections or brackets are located outwardly of the rail 11 and adjacent each of the rail slots 19, at which it is desired to have individual pallet latching action; and the vertical height of slots 19 and spacing of sections 21, 22 relative to one another at these locations is such as to receive therebetween, with reasonable swinging clearance, the latching part or dog 25 of the assembly 10.

This part is of a rugged, relatively thick design, being characterized by a projecting latching nose 26 of generally rectangular outline in plan and an integral, longitudinally extending pivoting portion or extension 27, also generally rectangular in outline, which projects at approximately 90° from the nose 26. An inclined upright edge 28 of latch 25, remote from extension 27, extends outwardly from nose 26, and would normally prevent excessive inward swing of latch 25 through the rail slot 19 beyond a predetermined position. However, the latch 25 is ordinarily locked positively in place in both of its intended operative and inoperative or withdrawn positions, in the former of which the edge 28 is out of contact with the rail slot 19, as shown in FIG. 3.

The respective angle mounting brackets 21, 22 are provided with vertically aligned holes 30 which receive a pivot bolt or stud 31, this bolt passing through a vertically aligned hole 32 in the pivoting extension portion 27 of latch or dog 25, and receiving a nut 33 beneath the horizontal flange of the angle bracket to hold the bolt in place as a pivotal axis for the swinging action of the latch member 25.

The angle brackets 21, 22 are provided with further lock pin apertures 35, for a purpose to be described, which are aligned vertically with one another at points substantially spaced away from the respective aligned pivot holes 30. The latch 25 is itself provided, in addition to its pivot hole 32, with a pair of holding or locking apertures 37, 38; these lie on the arc of a circle which is centered on the axis of the pivot bolt 31 and pivot hole 32; and the bracket apertures 35 also lie on the arc. The apertures 37, 38 are of substantially the same diameter as the angle bracket holes 35, only slightly exceed that of a reduced diameter lower portion of a quick release lock pin 40 of the assembly.

Figure 2:
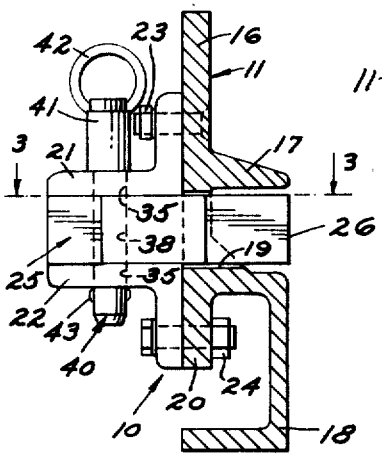
FIG. 2 is a view in transverse vertical section showing the equipment as applied to a known type of longitudinally extending cargo restraint rail in a typical installation.

The lock pin 40 has a larger diameter shoulder 4, adapted to rest upon the top of the upper angle bracket or section 21 when the pin is in place, as shown in FIG. 2. A pull ring 42 is pivoted on the top of pin 40.

Figure 5:
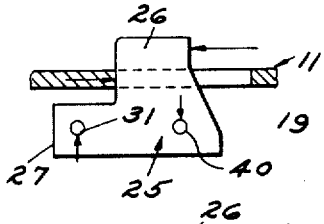
FIGS. 5 and 6 are schematics in plan showing the nature of the fore-and-aft locking action exerted by a releasable latching assembly in accordance with the embodiment of the invention in question.
Figure 6:
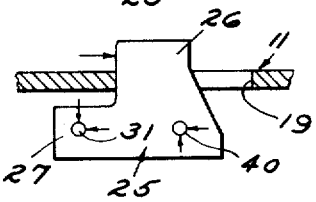

Thus, with the latch 25 in an inward, operative latching position projecting through the rail slot 19 and into the side recess 13 of a load platform or pallet 12 (FIG. 3), and locked in place by the quick release lock pin 40 extending through its outer operture 38 (solid line in FIG. 3) the latch is effective, in the manner illustrated in FIGS. 5 and 6 of the drawings, to exercise both forward restraint (upper arrow in FIG. 5) or aft restraint (upper arrow in FIG. 6) on the pallet. When withdrawn to the dotted line position of FIG. 3, the pin 40 is inserted through the aperture 37 of latch dog 25 and flange holes 35 to hold the dog in that position.

Figure 8:
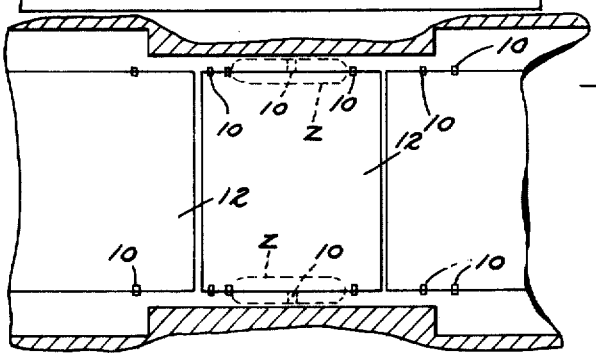
FIG. 8 is a fragmentary schematic view in plan indicating a typical loading arrangement whereby individual load pallet assemblies are locked fore-and-aft in place by plural latching sub-assemblies in accordance with the invention.

As illustrated in FIG. 8, the presence of plural latching assemblies 10 at spaced points along t he length of the respective restraining rails 11 enables latching action to be exerted on any given pallet 12 at a plurality of points along its length, for a more rugged restraint. FIG. 8 also suggests the fact that, in any given, relatively inaccessible area, such as a wheel well zone Z, not all of the assemblies 10 (assuming the same to be individually actuable by hand) need be employed. Certain thereof in this zone, shown in dotted line in FIG. 8, may be left in a retracted position.

Suitable means may be provided to resist accidental upward displacement of the quick release lock pin 40 from either locking relation to the rail 11, for example, spring-biased ball detent means 43 adjust its lower end and beneath the lower mounting angle 22.

Of course, in the retracted swung-back position, shown in dotted line in FIG. 3, the latch dog 25 is positively locked by re-inserting the lock pin 40, in the apertures 35.

Figure 1:
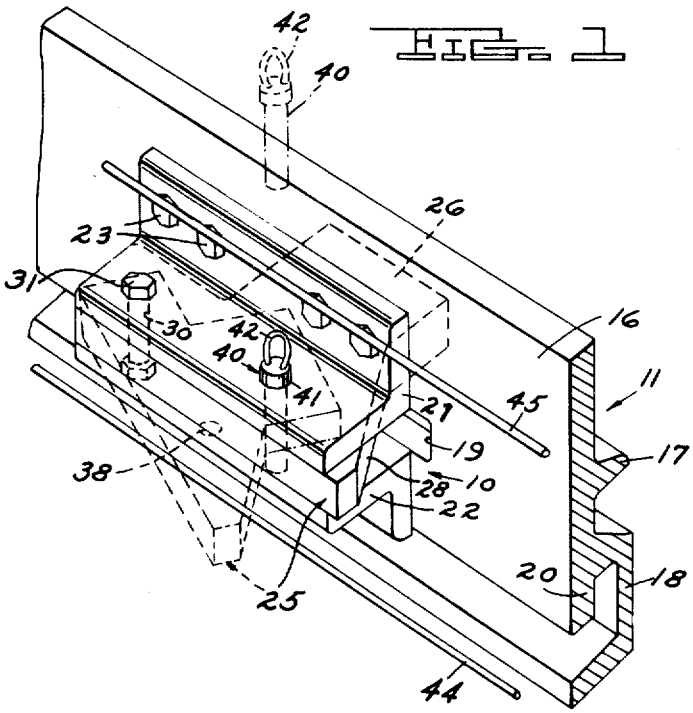

Schematic FIG. 1 shows an emergency release cable 44 and a parachute release cable 45 of the known aerial unloading kit installation, which are not interfered with by the application of the latch assemblies 10.

Figure 7:
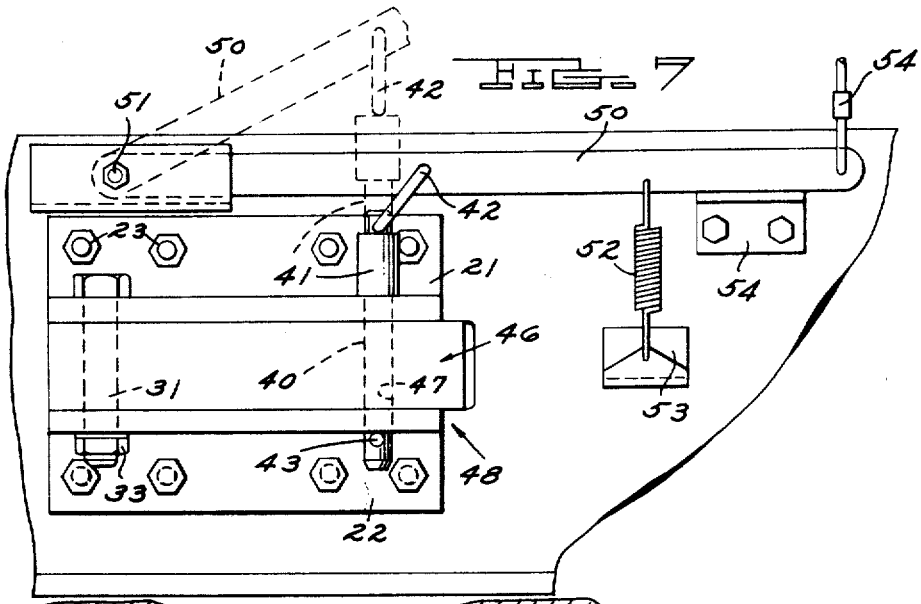
FIG. 7 is a fragmentary side elevation illustrating the principles of the invention as employed in an alternative installation for the automatic unlatching of loads, such as might be employed in the event one or more individual latching assemblies were in an inaccessible location, or for increased speed in simultaneously releasing several load components.
Figure 9:
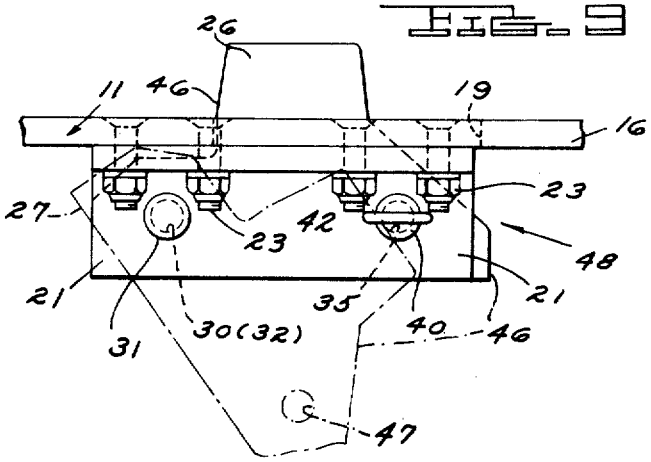
FIG. 9 is a fragmentary top plan view showing a modified form of latch mechanism employing a different type of latch or dog part, as in FIG. 7.

Referring to FIG. 7 in conjunction with FIG. 8 and 9, provision is shown in FIG. 7 for the withdrawal of the quick release lock pin 40 and release of the latch dog, in the event it is desired to unlock a pallet 12 in an area relatively inaccessible for convenient manual individual operation in a loaded cargo space. Indeed, an arrangement of this sort would enable the automatic unlatching of a number of assemblies 10 simultaneously in an emergency situation. In this instance (and as is also possible in an installation like that of FIGS. 1 through 4), it is desirable to employ a modified and simplified type of latch part or dog 46 having but a single lock pin receiving aperture 47 (see FIGS. 7 and 9) located more remote from the pivot axis of the dog than the dual apertures 37, 38 of the dog of FIGS. 1–4. This enables the dog 46, due to its greater moment arm between pivot axis and lock pin 40, to exert a greater restraining force on the pallet under a given pressure on the pin. By the same token, it enables the pin to be more easily withdrawn when desired.

Otherwise, it will be understood that the assembly of FIGS. 7 and 9, specially designated 48, is in full accordance with what is shown in FIGS. 1 through 4, so that further description of parts and relationships can be dispensed with to this extent, corresponding reference numerals designating corresponding parts.

As illustrated in FIG. 7, an elongated operating lever 50 is pivotally connected at one end, as by a stud 51, to a suitably elevated point on the restraining rail 11, and the pull ring 42 is connected to lever 50 at a point in well spaced relation to the pivot. A coiled tension spring 52, suitably anchored at one end by a mounting bracket 53 on rail 11, is connected upwardly to the lever 50, thus biasing the latter downwardly as shown in FIG. 7 against a fixed stop bracket 54 on the rail. The outer end of lever 50 is adapted to be operated by an appropriate release line 54 connected thereto, as from a point remote from the inaccessible area in question, such as a wheel well This enables a latch 46 in locked position in this area to be automatically released with ease from the remote point.

Of course, a number of assemblies 48, other than this at an inaccessible area or areas, may be equipped with release lever provisions of the sort shown in FIG. 7, the release lines 54 of all being operated from a common actuator (not shown) of one sort of another. This would enable simultaneous emergency release, if desired, of a number of pallets for quick unloading.

As illustrated in FIG. 9, any latch dog 46 may be locked in its released position (dot-dash line) by simply reinserting the quick release lock pin 40 in the holes or apertures 35 of brackets 21, 22, ahead or outwardly of the pallet latching nose of the retracted dog 46. Thus the need for dual locking apertures in the dog, as in the first embodiment, is avoided.

It sometimes happens that the force exerted by a load pallet in one horizontal direction or another is so great as to frictionally bind or snub the quick release lock pin to such an extent as to make it very difficult to withdraw the latter vertically and unlock the latch dog. Therefore, with the object of meeting this contingency, the further modified embodiment of the invention illustrated in FIGS. 10 through 15 is provided.

Its features are such as to enable the quick release lock pin to be manually released (or through the agency of remote control means of the type featured in FIG. 7), in the event excessive binding force is not exerted on the pin yet it also has a toggle or over-center type linkage controlling a special detent member on the latch dog to enable unlocking and retraction of the latter in the event excess binding force is present. As before, structural features of the embodiment of FIGS. 10–15 which correspond to those of the embodiments heretofore described will be designated by corresponding reference numerals, and further description thereof will be dispensed with.

In this instance, the latch dog, specially designated 56 (see FIG. 13 in conjunction with FIGS. 10–12), is formed to provide, in addition to its pivot aperture or hole 57 which receives the pivot pin 31 as before, a pair of vertically spaced or forked ears 58 extending from an inner surface of the body of the dog, as well as a pair of further vertically spaced, forked ears 59 projecting longitudinally thereof at the end opposite the pivoting end of the dog. The ears 59 are provided with vertically aligned pivot openings 60, and receive therebetween the locking or detent element 61 shown in FIG. 14.

Viewing FIG. 14 in conjunction with FIG. 12, the detent 61 is of full vertical thickness, corresponding to the maximum thickness of the latch dog 56, in an outer detent portion 62 thereof, which is shaped in the form of a generally semi-circular hook. Inwardly of the hooked portion 62, detent member 61 is formed in a reduced thickness at 63, where it is provided with a pivot opening 64; and detent 61 is of still further reduced thickness at an inner extremity 65, which is in turn provided with a hole 66 therethrough, for a purpose to be described. As illustrated in FIGS. 10 and 12, an upright pin 68 pivotally connects the detent member 61, with its intermediate portion 63 disposed between the forked ears 59 of latch dog 56, at the aligned pivot openings 64 and 60, respectively, of detent 61 and dog 56.

As thus disposed, the detent 61 is swingable clockwise (FIG. 10) about the pivot pin 68 from the solid line position of that figure to the dot-dash line position. In the solid line position, the hooked portion 62 of detent 61 engages about the lock pin 40 (which is releasably receivable in the aligned apertures 35 of the brackets 21, 22, as before), thus to hold latch dog 56 in the operative, solid line latching position of FIG. 10. In the withdrawn, dot-dash line position thereof, retracting swing of the latch dog to the inoperative position, not shown, is permitted. Thus it is seen that the embodiment of FIGS. 10 through 15 affords a manually releasable lock pin 40, as in the other embodiments, coupled with a special pivoted locking detent by which the dog may be unlocked to release a pallet 12, notwithstanding the degree of force exerted by the pallet upon the latch dog.

Another component of the embodiment under consideration is a bell crank 70 (FIG. 15) having a pivot opening 71 at its apex, from which arms 72, 73 diverge. Bell crank 70 is pivotally connected at its apex opening 71 between the forked ears 58 of latch dog 56, as by a pivot pin 74; and the arm 72 of the bell crank is provided with a pivot opening 75, at which a pivot pin 76 (FIG. 10) articulates the same to one end of a pair of parallel links 77. The links 77 are in turn pivotally connected to the inner portion 65 of detent member 61, above and below said portion, as by a pin 78 passing through the hole 66 in the portion 65.

A coil tension spring 80 extends between a connection to the link pivoting pin 78 and a connection to the arm 73 of bell crank 70 at a hole 81 in an outer end of the arm 73, as illustrated in FIG. 10, and a suitable cable 82 is also operatively connected to the arm 73, as at a further hole 83 adjacent the hole 81.

Referring to FIG. 10, it will be noted that with the links 77 straightened in the manner of a toggle (solid line) the pivotal connection of the same at 76 to the arm 72 of bell crank 70 lies over-center to the outer side of a theoretical line A—A through the bell crank axis at 74 and the connection of the links 77 to detent member 61 at pin 78. Thus, the over-center linkage constituted by links 77 and bell crank 70 holds detent 61 in an operative lock position (solid line in FIG. 10) in which its hook portion 62 extends around the quick release lock pin 40, thereby holding the detent and the latch dog 56 against retractile movement from the operative solid line locking position.

However, upon swinging of the bell crank 70 clockwise about its pivot at 74, as through the agency of the cable 82, the straight toggle line of links 77 and bell crank arm 72 is broken, the linkage moving to the dot-dash line position of FIG. 10, and the detent member to the dot-dash line position of FIG. 10, in which the detent is freed from locking restraint by pin 40. The linkage is restored to operative, locking position by straightening the over-center links 77 to the position previously referred to, with pivot 76 above the line A—A (FIG. 10) by the tensile action of spring 80.

Of course, the release pin 40 remains manually removable from the apertures 35 of the mounting brackets 21, 22, as indicated in FIG. 12, so that the lever and linkage actuation of the detent 56 need not be resorted to except in cases when there is a strong force exerted by the load on the latch dog 56 tending to bind the detent 61 against lock pin 40.

In view of the fact that the dog 56 must swing clear of pin 40 in the toggle actuation thereof, i.e., on the arc B of FIG. 10, provisions of the type shown in the first embodiment are employed to hold the dog in its released position. That is, the dog 56 is provided with a through aperture 85 which, in the released position, aligns with the holes 86 in the brackets 21, 22 at the same general location as the holes 35 of the embodiment of FIGS. 1–4.

The parts of the latch assembly, in any of its embodiments 10, are simple, extremely rugged and strong, and inexpensive to manufacture. Installation to existing rail equipment is also quick and inexpensive, without significant modification of the existing structure. For this reason the invention provides a development in the improvement and simplification of aircraft cargo loading systems, logistic and otherwise, which has great merit.

What I claim as my invention is:

[1. In a load latching mechanism for application to a longitudinally extending, upright side restraining rail to laterally restrain a load for longitudinal movement in either direction relative to said rail, a latching device adapted to be fixedly applied to a side of said rail, said device comprising a latch dog pivotally mounted to swing in a horizontal plane paralleling the direction of movement of said load and into and out of a latching position in which said latch dog is latched to project substantially outwardly of a side of said rail, said latch dog having generally parallel front and rear surfaces engageable by said load when the dog thus projects to restrain movement of the load in either longitudinal direction, said device having means to latch said dog in said restraining position, the dog being engaged and swung in said plane by the load to a retracted position relative to the rail when unlatched by said means and when the load moves in one of said directions.]

[2. A load latching mechanism in accordance with claim 1, in which said dog latching means comprises a detent movably mounted on said dog, and a member in fixed relation to said rail, said detent being releasably engageable with said last named member to latch the dog in the restraining position.]

[3. A load latching mechanism in accordance with claim 1, in which said dog latching means comprises a detent movably mounted on said dog, a member in fixed relation to said rail, said detent being releasably engageable with said last named member to latch the dog in the restraining position, and over-center means holding said detent in position to so latch said dog.]

[4. In a load latching mechanism for application to a longitudinally extending, upright side restraining rail to laterally restrain a load for longitudinal movement in either direction relative to said rail, a latching device adapted to be fixedly applied to a side of said rail, said device comprising a mounting element on the rail, and a latch dog pivotally connected to said mounting element to swing in a horizontal plane paralleling the direction of movement of said load and into and out of a latching position in which said latch dog is locked to project outwardly of the side of said rail opposite said mounting element, said latch dog having generally parallel front and rear surfaces engageable by said load when the dog thus projects to restrain movement of the load in either longitudinal direction, said dog having means to coact with said mounting element in the locking of said dog in said restraining position, the dog being engaged and swung in said plane by the load to a retracted position relative to the rail when unlocked by said means and when the load moves in one of said directions.]

[5. In a load latching mechanism for application to a longitudinally extending, upright side restraining rail to laterally restrain a load for longitudinal movement in either direction relative to said rail, a latching device adapted to be fixedly applied to a side of said rail, said device comprising a mounting element on the rail, and a latch dog pivotally connected to said mounting element to swing in a horizontal plane paralleling the direction of movement of said load and into and out of a latching position in which said latch dog is locked to project outwardly of the side of said rail opposite said mounting element, said latch dog having generally parallel front and rear surfaces engageable by said load when the dog thus projects to restrain movement of the load in either longitudinal direction, said dog having means to coact with said mounting element in the locking of said dog in said restraining position, the dog being engaged and swung in said plane by the load to a retracted position relative to the rail when unlocked by said means and when the load moves in one of said directions, said mounting element having a pin thereon, said dog having means engaging said pin to hold the dog in said restraining position.]

[6. In a latching mechanism for applications to a longitudinally extending, upright side restraining rail to laterally restrain a load for longitudinal movement in either direction relative to said rail, a latching device adapted to be fixedly applied to a side of said rail, said device comprising a mounting element on the rail, and a latch dog pivotally connected to said mounting element to swing in a horizontal plane paralleling the direction of movement of said load and into and out of a latching position in which said latch dog is locked to project outwardly of the side of said rail opposite said mounting element, said latch dog having generally parallel front and rear surfaces engageable by said load when the dog thus projects to restrain movement of the load in either longitudinal direction, said dog having means to coact with said mounting element in the locking of said dog in said restraining position, the dog being engaged and swung in said plane by the load to a retracted position relative to the rail when unlocked by said means and when the load moves in one of said direction, said mounting element having a pin removably mounted thereon, said dog having means engageable with said pin to hold the dog in said restraining position, said pin being removable from said mounting element and replaceable thereon for engagement by said dog means to hold the dog in said retracted position.]

[7. In a load latching mechanism for application to a longitudinally extending, upright side restraining rail to laterally restrain a load for longitudinal movement in either direction relative to said rail, a latching device adapted to be fixedly applied to a side of said rail, said device comprising a mounting element on the rail, and a latch dog pivotally connected to said mounting element to swing in a horizontal plane paralleling the direction of movement of said load and into and out of a latching position in which said latch dog is locked to project outwardly of the side of said rail opposite said mounting element, said latch dog having generally parallel front and rear surfaces engageable by said load when the dog thus projects to restrain movement of the load in either longitudinal direction, said dog having means to coact with said mounting element in the locking of said dog in said restraining position, the dog being engaged and swung in said plane by the load to a retracted position relative to the rail when unlocked by said means and when the load moves in one of said directions, said mounting element having a pin thereon, said dog having means engaging said pin to hold the dog in said restraining position, said dog means comprising a detent movably carried by said dog for movement into and out of position to engage said pin and hold the dog in said restraining position.]

[8. In a load latching mechanism for application to a longitudinally extending, upright side restraining rail to laterally restrain a load for longitudinal movement in either direction relative to said rail, a latching device adapted to be fixedly applied to a side of said rail, said device comprising a mounting element on the rail, and a latch dog pivotally connected to said mounting element to swing in a horizontal plane paralleling the direction of movement of said load and into and out of a latching position in which said latch dog is locked to project outwardly of the side of said rail opposite said mounting element, said latch dog having generally parallel front and rear surfaces engageable by said load when the dog thus projects to restrain movement of the load in either longitudinal direction, said dog having means to coact with said mounting element in the locking of said dog in said restraining position, the dog being engaged and swung in said plane by the load to a retracted position relative to the rail when unlocked by said means and when the load moves in one of said directions, said mounting element having a pin removably mounted thereon, said dog having means engageable with said pin to hold the dog in said restraining position, said pin being removable from said mounting element and replaceable thereon for engagement by said dog means to hold the dog in said retracted position, said dog means comprising a detent movably carried by said dog for movement into and out of position to engage said pin and hold the dog in said restraining position.]

[9. In a load latching mechanism for application to a longitudinally extending, upright side restraining rail to laterally restrain a load for longitudinal movement in either direction relative to said rail, a latching device adapted to be fixedly applied to a side of said rail, said device comprising a mounting element on the rail, and a latch dog pivotally connected to said mounting element to swing in a horizontal plane paralleling the direction of movement of said load and into and out of a latching position in which said latch dog is locked to project outwardly of the side of said rail opposite said mounting element, said latch dog having generally parallel front and rear surfaces engageable by said load when the dog thus projects to restrain movement of the load in either longitudinal direction, said dog having means to coact with said mounting element in the locking of said dog in said restraining position, the dog being engaged and swung in said plane by the load to a retracted position relative to the rail when unlocked by said means and when the load moves in one of said directions, said mounting element having a pin thereon, said dog having means engaging said pin to hold the dog in said restraining position, said dog means comprising a detent movably carried by said dog for movement into and out of position to engage said pin and hold the dog in said restraining position, and an overcenter linkage carried by said mounting element and operable to so move said detent.]

[10. In a load latching mechanism for application to a longitudinally extending, upright side restraining rail to laterally restrain a load for longitudinal movement in either direction relative to said rail, a latching device adapted to be fixedly applied to a side of said rail, said device comprising a mounting element on the rail, and a latch dog pivotally connected to said mounting element to swing in a horizontal plane paralleling the direction of movement of said load and into and out of a latching position in which said latch dog is locked to project outwardly of the side of said rail opposite said mounting element, said latch dog having generally parallel front and rear surfaces engageable by said load when the dog thus projects to restrain movement of the load in either longitudinal direction, said dog having means to coact with said mounting element in the locking of said dog in said restraining position, the dog being engaged and swung in said plane by the load to a retracted position relative to the rail when unlocked by said means, and when the load moves in one of said directions, said mounting element having a pin removably mounted thereon, said dog having means engageable with said pin to hold the dog in said restraining position, said pin being removable from said mounting element and replaceable thereon for engagement by said dog means to hold the dog in said retracted position, said dog means comprising a detent movably carried by said dog for movement into and out of position to engage said pin and hold the dog in said restraining position, and an overcenter linkage carried by said mounting element and operable to so move said detent.]

[11. In a load latching mechanism for application to a longitudinally extending, upright side restraining rail having a longitudinally extending aperture formed therethrough, a latching device adapted to be fixedly applied to an inner side of said rail adjacent said aperture, said device comprising a mounting element having means to secure the same to said rail in vertically spaced relation to said rail aperture, a latch dog pivotally connected to said mounting element to swing in a horizontal plane into and out of a latching position in which said latch dog is locked to project through said rail aperture and outwardly of the side of said rail opposite said mounting element, a locking member on said mounting element to releasably lock said latch dog in said latching position, said latch dog having means to coact with said mounting element and locking member in the locking of said dog, and means to operate said latching device from a point relatively remote from the latter to allow movement of said latch dog out of said latching position, comprising a lever having means operatively connecting the same to said latch dog means to effect relative disengagement of said latch dog and said locking member, said latch dog means including a detent arm pivotally mounted on said latch dog for releasable restraining engagement with said locking member, said lever connecting means including a toggle connection operatively connecting the lever with said detent and actuable upon operation of said lever to move the detent out of said restraining engagement with the locking member.]

12. A load latching device for attachment to an upright restraining rail, comprising mounting bracket means on said rail, a latch dog having means pivotally mounting the same for horizontal swinging movement on said bracket means into and out of a latching position in which it projects on one side of said rail, and means releasably securing said dog in said latching position, comprising a locking pin, said bracket means having an aperture in laterally spaced relation to the pivotal axis of said latch dog to receive said locking pin, said latch dog having a detent movably mounted thereon adjacent said locking pin for movement into and out of position to engage said locking pin and prevent movement of the dog out of the latching position of the latter, and means releasably holding said detent in said pin-engaging position.

13. [In a] A load latching device for attachment to an upright restraining rail, comprising mounting bracket means on said rail, a latch dog having means pivotally mounting the same for horizontal swinging movement on said bracket means into and out of a latching position in which it projects on one side of said rail, and means releasably securing said dog in said latching position, comprising a locking pin, said bracket means having an aperture in laterally spaced relation to the pivotal axis of said latch dog to receive said locking pin, said latch dog having a detent movably mounted thereon adjacent said locking pin for movement into and out of position to engage said locking pin and prevent movement of the dog out of the latching position of the latter, and means releasably holding said detent in said pin-engaging position, including an overcenter linkage operatively connected with said detent to swing the same out of said pin-engaging position.

14. In a load latching mechanism for application to a longitudinally extending, upright side restraining rail having a longitudinally extending aperture formed therethrough, a latching device adapted to be fixedly applied to an inner side of said rail adjacent said aperture, said device comprising a mounting element having means to secure the same to said rail in vertically spaced relation to said rail aperture, a latch dog pivotally connected to said mounting element to swing in a horizontal plane into and out of a latching position in which said latch dog is locked to project through said rail aperture and outwardly of the side of said rail opposite said mounting element, a locking member on said mounting element to releasably lock said latch dog in said latching position, said latch dog having means to coact with said mounting element and locking member in the locking of said dog, including a locking formation on said dog to receive at least a portion of said locking member, and means to operate said latching device from a point relatively remote from the latter to allow movement of said latch dog out of said latching position, comprising a lever having means operatively connecting the same to said latch dog means to effect relative disengagement of said latch dog locking formation and said locking member, said latch dog means including a detent arm pivotally mounted on said latch dog for releasable restraining engagement with said locking member, said lever connecting means including a toggle connection operatively connecting the lever with said detent and actuable upon operation of said lever to move the detent out of said restraining engagement with the locking member.

15. A load latching device for attachment to an upright restraining rail, comprising a pair of mounting brackets having means to secure the same to one side of said rail in vertically spaced relation to one another, a latch dog having means pivotally mounting the same to said brackets for horizontal swinging movement between said brackets into and out of a latching position in which it projects on the other side of said rail, and means releasably securing said dog in said latching position, comprising a locking pin, said brackets having vertically aligned apertures in laterally spaced relation to the pivotal axis of said latch dog to receive said locking pin, said latch dog having a detent pivotally mounted thereon adjacent said locking pin for movement into and out of position to engage said locking pin and prevent movement of the dog out of the latching position of the latter, and means releasably holding said detent in said pin-engaging position.

16. A load latching device for attachment to an upright restraining rail, comprising a pair of mounting brackets having means to secure the same to one side of said rail in vertically spaced relation to one another, a latch dog having means pivotally mounting the same to said brackets for horizontal swinging movement between said brackets into and out of a latching position in which it projects on the other side of said rail, and means releasably securing said dog in said latching position, comprising a locking pin, said brackets having vertically aligned apertures in laterally spaced relation to the pivotal axis of said latch dog to receive said locking pin, said latch dog having a detent pivotally mounted thereon adjacent said locking pin for movement into and out of position to engage said locking pin and prevent movement of the dog out of the latching position of the latter, and means releasably holding said detent in said pin-engaging position, including an over-center linkage operatively connected with said detent to swing the same out of said pin-engaging position.

17. A load latching device for attachment to an upright restraining rail, comprising mounting bracket means having means to secure the same to said rail, a latch dog having means pivotally mounting the same for horizontal swinging movement on said bracket means into and out of a latching position in which it projects on one side of said rail, and means releasably securing said dog in said latching position, comprising a locking pin, said bracket means having an aperture in laterally spaced relation to the pivotal axis of said latch dog to receive said locking pin, said latch dog having a detent pivotally mounted thereon adjacent said locking pin for movement into and out of position to engage said locking pin and prevent movement of the dog out of the latching position of the latter, and means releasably holding said detent in said pin-engaging position.

18. A load latching device for attachment to an upright restraining rail, comprising mounting bracket means having means to secure the same to said rail, a latch dog having means pivotally mounting the same for horizontal swinging movement on said bracket means into and out of a latching position in which it projects on one side of said rail, and means releasably securing said dog in said latching position, comprising a locking pin, said bracket means having an aperture in laterally spaced relation to the pivotal axis of said latch dog to receive said locking pin, said latch dog having a detent pivotally mounted thereon adjacent said locking pin for movement into and out of position to engage said locking pin and prevent movement of the dog out of the latching position of the latter, and means releasably holding said detent in said pin-engaging position, including an over-center linkage operatively connected with said detent to swing the same out of said pin-engaging position.

*19. In a load latching mechanism for application to a longitudinally extending, upright side restraining rail to laterally restrain a load for longitudinal movement in either direction relative to said rail, a latching device adapted to be fixedly applied to a side of said rail, said device comprising a latch dog pivotally mounted to swing in a horizontal plane paralleling the direction of movement of said load and into and out of a latching position in which said latch dog is latched to project substantially outwardly of a side of said rail, said latch dog having generally parallel front and rear surfaces engageable by said load when the dog thus projects to restrain movement of the load in either longitudinal direction, said device having means to latch said dog in said restraining position, the dog being engaged and swung in said plane by the load to a retracted position relative to the rail when unlatched by said means and when the load moves in one of said directions, said dog latching means comprising a detent movably mounted on said dog, and a member in fixed relation to said rail, said detent being releasably engageable with said last named member to latch the dog in the restraining position, and a mounting element on said rail to which said latch dog is pivotally connected, said mounting member in fixed relation to said rail being a pin on said mounting element, said detent engaging said pin to hold the dog in said restraining position.*

*20. A load latching mechanism in accordance with claim 19, in which said pin is removable from said mounting element and replaceable thereon for engagement by said detent to hold the dog in said retracted position.*

*21. A load latching mechanism in accordance with claim 20, and further comprising an over-center linkage carried by said mounting element and operable to so move said detent.*

*22. A load latching mechanism in accordance with claim 19, and further comprising means to operate said detent from a point relatively remote from the latter.*

*23. In a load latching mechanism for application to a longitudinally extending, upright side restraining rail to laterally restrain a load for longitudinal movement in either direction relative to said rail, a latching device adapted to be fixedly applied to a side of said rail, said device comprising a latch dog pivotally mounted to swing in a horizontal plane paralleling the direction of movement of said load and into and out of a latching position in which said latch dog is latched to project substantially outwardly of a side of said rail, said latch dog having generally parallel front and rear surfaces engageable by said load when the dog thus projects to restrain movement of the load in either longitudinal direction, said device having means to latch said dog in said restraining position, the dog being engaged and swung in said plane by the load to a retracted position relative to the rail unlatched by said means and when the load moves in one of said directions, said dog latching means comprising a detent pivotally mounted on said dog on an axis paralleling the axis of swing of the dog, a member in fixed relation to said rail, said detent being releasably engageable with said last named member upon pivotal movement of the detent about its said axis to latch the dog in the restraining position, means yieldably opposing the pivoting of said detent to said restraining position, and over-center means holding said detent in position to so latch said dog.*

*24. In a load latching mechanism for application to a longitudinally extending, upright side restraining rail to laterally restrain a load for longitudinal movement in either direction relative to said rail, a latching device adapted to be fixedly applied to a side of said rail, said device comprising a latch dog pivotally mounted to swing in a horizontal plane paralleling the direction of movement of said load and into and out of a latching position in which said latch dog is latched to project substantially outwardly of a side of said rail, said latch*

*dog having generally parallel front and rear surfaces engageable by said load when the dog thus projects to restrain movement of the load in either longitudinal direction, said device having means to latch said dog in said restraining position, the dog being engaged and swung in said plane by the load to a retracted position relative to the rail when unlatched by said means and when the load moves in one of said directions, said dog latching means comprising a detent pivotally mounted on said dog on an axis paralleling the axis of swing of the dog, a member in fixed relation to said rail, said detent being releasably engageable with said last named member upon pivotal movement of the detent about its said axis to latch the dog in the restraining position, means yieldably opposing the pivoting of said detent to said restraining position, and means to operate said detent from a point relatively remote from the latter.*

*25. In a load latching mechanism for application to a longitudinally extending, upright side restraining rail to laterally restrain a load for longitudinal movement in either direction relative to said rail, a latching device adapted to be fixedly applied to a side of said rail, said device comprising a latch dog pivotally mounted to swing in a horizontal plane paralleling the direction of movement of said load and into and out of a latching position in which said latch dog is latched to project substantially outwardly of a side of said rail, said latch dog having generally parallel front and rear surfaces engageable by said load when the dog thus projects to restrain movement of the load in either longitudinal direction, said device having means to latch said dog in said restraining position, the dog being engaged and swung in said plane by the load to a retracted position relative to the rail when unlatched by said means and when the load moves in one of said directions, said dog latching means comprising a detent pivotally mounted on said dog on an axis paralleling the axis of swing of the dog, a member in fixed relation to said rail, said detent being releasably engageable with said last named member upon pivotal movement of the detent about its said axis to latch the dog in the restraining position, and means yieldably opposing the pivoting of said detent to said restraining position.*

References Cited

The following references, cited by the Examiner, are of record in the patented file of this patent or the original patent.

UNITED STATES PATENTS

| | | | |
|---|---|---|---|
| 1,602,146 | 10/1926 | Callison | 296—35.1 X |
| 2,150,371 | 3/1939 | Furnish | 296—35.1 |
| 2,351,314 | 6/1944 | Ario | 296—35.1 |
| 2,424,429 | 7/1947 | Bamberg | 296—35.1 |
| 2,427,603 | 9/1947 | Higgins | 296—35.1 |
| 2,876,016 | 3/1959 | McClellan | 296—35.1 |
| 2,101,368 | 12/1937 | Hartbauer | 105—377 |
| 2,764,443 | 9/1956 | Bennett | 292—210 X |
| 2,799,900 | 7/1957 | Gardner et al. | 105—378 X |
| 2,901,279 | 8/1959 | Mac Naught et al. | 292—256.5 |

OTHER REFERENCES

Article entitled, "Materials Handling Support System," by Lt. Col. M. E. Peterson and Maj. C. M. Edmonds, presented in the period Jan. 9–13, 1961, at the 1961 S.A.E. International Congress and Exposition in Detroit, Mich. (Pp. 4 and FIG. 2 relied upon.)

DRAYTON E. HOFFMAN, Primary Examiner

U.S. Cl. X.R.

105—369